(12) United States Patent
Watanabe et al.

(10) Patent No.: US 7,403,540 B2
(45) Date of Patent: Jul. 22, 2008

(54) TRANSMITTING SYSTEM, MEDIA CONVERTER AND TRANSMITTING METHOD

(75) Inventors: Hiroyuki Watanabe, Osaka (JP); Tomonori Shiomi, Osaka (JP); Akihiro Tatsuta, Kyoto (JP); Osamu Tanaka, Osaka (JP); Nobuhiko Arashin, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 570 days.

(21) Appl. No.: 11/079,062

(22) Filed: Mar. 14, 2005

(65) Prior Publication Data
US 2005/0271082 A1    Dec. 8, 2005

(30) Foreign Application Priority Data
Mar. 15, 2004    (JP)    ............ 2004-073344

(51) Int. Cl.
*H04J 3/16*    (2006.01)
(52) U.S. Cl. ...................... 370/466; 375/220
(58) Field of Classification Search ........... 370/466; 375/222; 714/712; 174/68.1
See application file for complete search history.

(56) References Cited
U.S. PATENT DOCUMENTS 6,909,741 B1* 6/2005 Smith et al. ............ 375/222
2002/0178411 A1* 11/2002 Kohda ................... 714/712
2004/0206539 A1* 10/2004 Saito ..................... 174/68.1
2007/0022331 A1* 1/2007 Jamieson et al. ........ 714/712

FOREIGN PATENT DOCUMENTS

JP    2000-261782    9/2000

\* cited by examiner

*Primary Examiner*—Chi H. Pham
*Assistant Examiner*—Albert T Chou
(74) *Attorney, Agent, or Firm*—RatnerPrestia (57) ABSTRACT

A transmitting system includes an Internet connecting unit, directly or indirectly connected with the Internet, which allows a plurality of communication units to perform communication through the Internet, and a media converter, connected with the Internet connecting unit by the first transmission medium, which converts a signal from the first transmission medium into a signal to a second transmission medium, converts a signal from the second transmission medium into a signal to the first transmission medium, and has a function of linking to the communication units. The transmitting system also includes a signal distributor, connected with the media converter and each of the plurality of communication units by the second transmission medium, which distributes a signal from the media converter and transfers the signal to the communication units, and transfers a signal from the communication units to the media converter.

7 Claims, 8 Drawing Sheets

| IPアドレス | MACアドレス |
|---|---|
| 192.168.0.0 | 12:34:56:78 |
| 192.168.0.1 | 12:34:56:90 |
| ... | ... |

TRANSMITTING SYSTEM, MEDIA CONVERTER AND TRANSMITTING METHOD

BACKGROUND OF THE INVENTION

1. Field of the Invention

The present invention relates to a transmitting system, media converter, and transmitting method which allow communication between terminals.

2. Related Art of the Invention

To access the Internet using a terminal with a communication function, DBL. using telephone lines, FTTH using optical fibers, a cable Internet system using coaxial cables, an Internet system utilizing wireless access points, or the like is used. In an Internet system as described above, terminals are linked to a central device, thereby allowing Internet access.

In the Internet system, when terminals accessing the Internet are to communicate with each other, the communication between the terminals is implemented through the central device or a repeater for the central device.

However, the Internet system has the disadvantage that if trouble or the like occurs in the central device or repeater, and the device becomes unable to operate normally, it becomes impossible to establish a link between each terminal and the central device, and that not only Internet access of the terminals but also communication between the terminals becomes impossible.

As measures to ameliorate the disadvantage, Japanese Patent Laid-Open No. 2000-261782 attempts to implement communication between terminals by using a loopback unit. A signal looped back in the loopback unit has a physical layer and a MAC layer in common with an uplink signal except for a frequency, so that the loopback unit is implemented by a simple arrangement with a band-pass filter, frequency converter, and the like.

The entire disclosure of Japanese Patent Laid-Open No. 2000-261782 is incorporated herein by reference in its entirety.

Even with the conventional technique described above, if trouble or the like occurs in a central device or repeater, and the device becomes unable to operate normally, a link between each terminal and the central device may become invalid, and communication between the terminals may become impossible.

More specifically, the conventional technique has the problem that if, for example, an abnormality occurs in the central device or repeater, and it becomes impossible to establish a link between the central device or repeater and each terminal, communication between the terminals may become impossible.

The present invention has been made in consideration of the above-described problem, and has its object to provide a transmitting system, media converter, and transmitting method which allow communication between terminals even when, for example, it becomes impossible to establish a link between a central device or repeater and each terminal.

SUMMARY OF THE INVENTION

The $1^{st}$ aspect of the present invention is a transmitting system comprising:

an Internet connecting unit which allows a plurality of communication units to perform communication through an Internet, and is directly or indirectly connected with said Internet;

a media converter which converts a signal from a first transmission medium into a signal to a second transmission medium, converts a signal from said second transmission medium into a signal to said first transmission medium, has a further function of linking to said communication units, and is connected with said Internet connecting unit by said first transmission medium; and a signal distributor which distributes a signal from said media converter to transfer the signal to said communication units, transfers a signal from said communication units to said media converter, and is connected with said media converter and the plurality of said communication units respectively by said second transmission medium.

The $2^{nd}$ aspect of the present invention is the transmitting system according to the $1^{st}$ aspect of the present invention, wherein the function of linking to said communication units is a function of performing, by sharing rules for transmitting said signal with said communication units, communication utilizing addresses on a side of said communication units.

The $3^{rd}$ aspect of the present invention is the transmitting system according to the $2^{nd}$ aspect of the present invention, wherein said media converter has address storage means of storing said addresses on the side of the plurality of said communication units and, in a case where an address affixed to data input from a side of said signal distributor is stored in said address storage means, outputs the data input from the side of said signal distributor to the side of said signal distributor.

The $4^{th}$ aspect of the present invention is the transmitting system according to the $1^{st}$ aspect of the present invention, wherein said media converter allows, by linking to the plurality of said communication units, communication between the plurality of said communication units.

The $5^{th}$ aspect of the present invention is the transmitting system according to the $1^{st}$ aspect of the present invention, wherein said Internet connecting unit allows, by linking to the plurality of said communication units, the plurality of said communication units to perform communication using said Internet, and when said Internet connecting unit becomes unable to link to the plurality of said communication units, said media converter allows, by linking to the plurality of said communication units, communication between the plurality of said communication units.

The $6^{th}$ aspect of the present invention is the transmitting system according to the $1^{st}$ aspect of the present invention, wherein said first transmission medium is an optical-fiber cable, and said second transmission medium is a coaxial cable.

The $7^{th}$ aspect of the present invention is a media converter comprising a converter which converts a signal from a first transmission medium into a signal to a second transmission medium, converts a signal from said second transmission medium into a signal to said first transmission medium, has a further function of linking to a plurality of communication units, allows the plurality of said communication units to perform communication through an Internet, and is connected with an Internet connecting unit directly or indirectly connected with said Internet, by said first transmission medium, wherein, by a signal distributor connected with said media converter and the plurality of said communication units respectively by said second transmission medium, a signal from said media converter is distributed and transferred to said communication units while a signal from said communication units is transferred to said media converter.

The 8th aspect of the present invention is a transmitting method comprising:

an Internet communication step of, by utilizing an Internet connecting unit directly or indirectly connected with an Internet, allowing a plurality of communication units to perform communication through said Internet;

a signal conversion step of, by utilizing a media converter which has a function of linking to said communication units and is connected with said Internet connecting unit by a first transmission medium, converting a signal from said first transmission medium into a signal to a second transmission medium and converting a signal from said second transmission medium into a signal to said first transmission medium; and a signal transfer step of, by utilizing a signal distributor connected with said media converter and the plurality of said communication units respectively by said second transmission medium, distributing a signal from said media converter and transferring the signal to said communication units, and transferring a signal from said communication units to said media converter.

The 9th aspect of the present invention is a program of causing a computer to perform the steps of the transmitting method according to the 8th aspect of the present invention, the steps being the Internet communication step of, by utilizing an Internet connecting unit directly or indirectly connected with an Internet, allowing a plurality of communication units to perform communication through said Internet; the signal conversion step of, by utilizing a media converter which has a function of linking to said communication units and is connected with said Internet connecting unit by a first transmission medium, converting a signal from said first transmission medium into a signal to a second transmission medium and converting a signal from said second transmission medium into a signal to said first transmission medium; and the signal transfer step of, by utilizing a signal distributor connected with said media converter and the plurality of said communication units respectively by said second transmission medium, distributing a signal from said media converter and transferring the signal to said communication units, and transferring a signal from said communication units to said media converter.

The 10th aspect of the present invention is a recording medium having the program according to the 9th aspect of the present invention recorded thereon, the recording medium being processable by a computer.

DESCRIPTION OF SYMBOLS

11 Internet connecting unit
21 media converter
22 Signal distributor
31a Communication unit
31b Communication unit
31c Communication unit
32a PC
32b PC
41 Optical signal transceiver
43 Frame control means
44 Electrical signal transceiver
46 MAC address storage means
51 Transceiver
52 PC interface
53 Self MAC address storage means
54 Correspondence table storage means
61 Communication interface
62 CPU
63 Memory
71 MAC address
81 Correspondence table
90 Frame
91 Frame header
92 Transfer destination MAC address
93 Transfer source MAC address
94 Frame data
95 IP packet
96 IP header
97 Transfer destination IP address
98 Transfer source IP address
101 Optical-fiber cable
102 Coaxial cable

PREFERRED EMBODIMENTS OF THE INVENTION

An embodiment of the present invention will be explained below with reference to the drawings.

Figure 1:
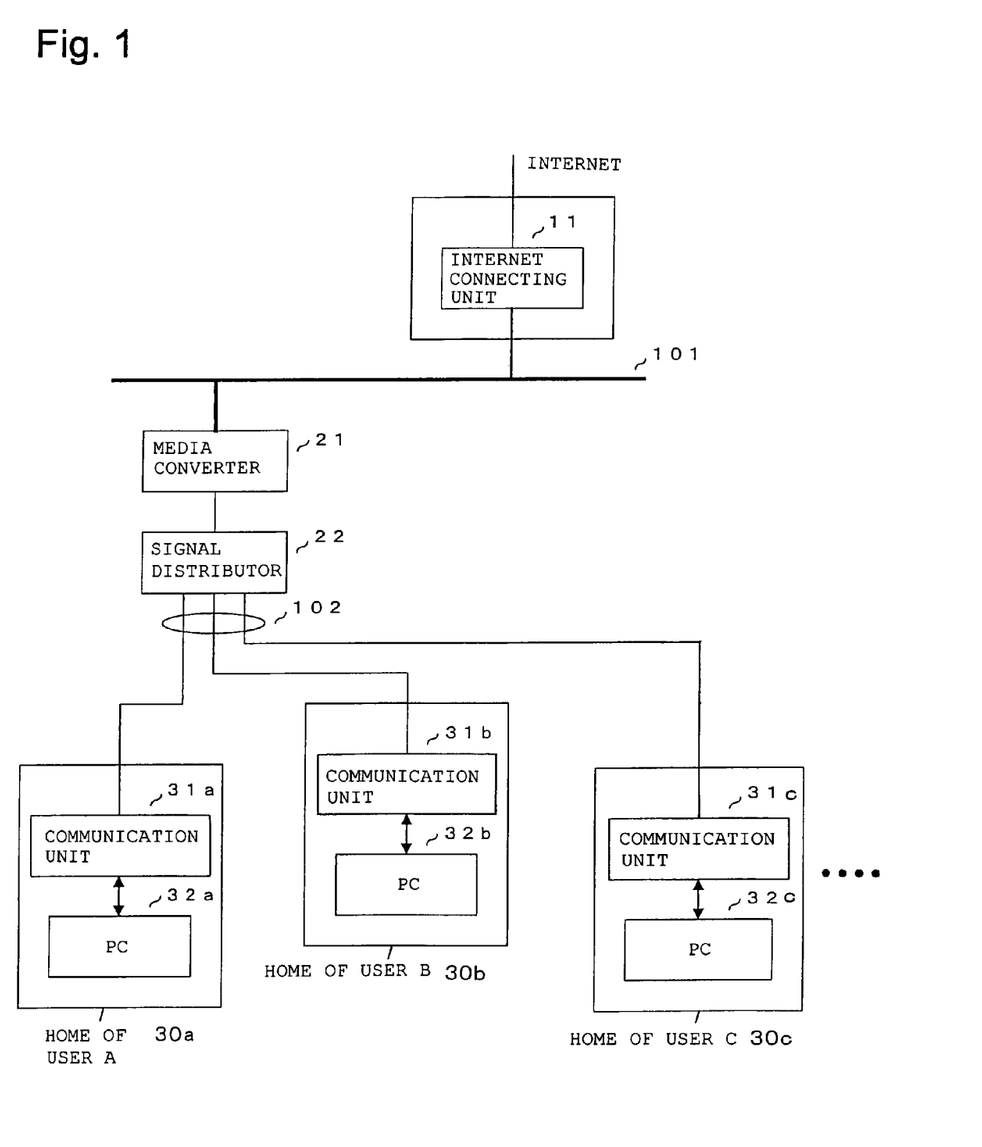
FIG. 1 is a diagram of the arrangement of a transmitting system according to an embodiment of the present invention.

FIG. 1 shows a diagram of the arrangement of a transmitting system of the embodiment of the present invention.

The transmitting system of this embodiment comprises an Internet connecting unit 11, media converter 21, signal distributor 22, communication units 31a, 31b, and 31c, and PCs (personal computers) 32a, 32b, and 32c.

The Internet connecting unit 11 is connected to the Internet and is also connected with the media converter 21 by an optical-fiber cable 101. The media converter 21 is connected with the signal distributor 22 by one of coaxial cables 102. The signal distributor 22 is connected with the plurality of communication units 31a, 31b, and 31c by the remaining coaxial cables 102. The communication units 31a, 31b, and 31c are respectively connected with the PCs 32a, 32b, and 32c by cables such as an Ethernet (registered trademark) (LAN) cable.

The Internet connecting unit 11 is installed at a central station which provides an Internet system and is means of implementing access of the PCs 32a, 32b, 32c, and the like to the Internet.

The optical-fiber cable 101 is used by the central station to provide Internet access to the homes of subscribers (a home 30a of a user A, a home 30b of a user B, a home of a user C, and the like) to an Internet access service and is a transmission medium which transmits optical signals.

The coaxial cables 102 are laid in the homes of subscribers (the home 30a of the user A, the home 30b of the user B, the home of the user C, and the like) and are cables which transmit electrical signals.

The media converter 21 is means of converting a signal between the optical-fiber cable 101 and the coaxial cables 102.

The signal distributor 22 is means of distributing a coaxial cable signal, having undergone conversion by the media converter 21, to the coaxial cables 102 laid in the homes of the subscribers and combining signals of the coaxial cables 102 from the homes of the subscribers (the home 30a of the user A, the home 30b of the user B, the home of the user C, and the like).

PCs 32 are personal computers on which subscribers utilize applications such as a WEB browser.

Communication units 31 are means, linked to the media converter 21 through the signal distributor 22, of implementing communication utilizing the PCs 32.

In FIG. 1, the communication units 31 and PCs 32 respectively installed in the different homes, the home 30a of the user A, the home 30b of the user B, and the home 30c of the user C are distinguished from each other with alphabetical subscripts a, b, and c.

Figure 2:
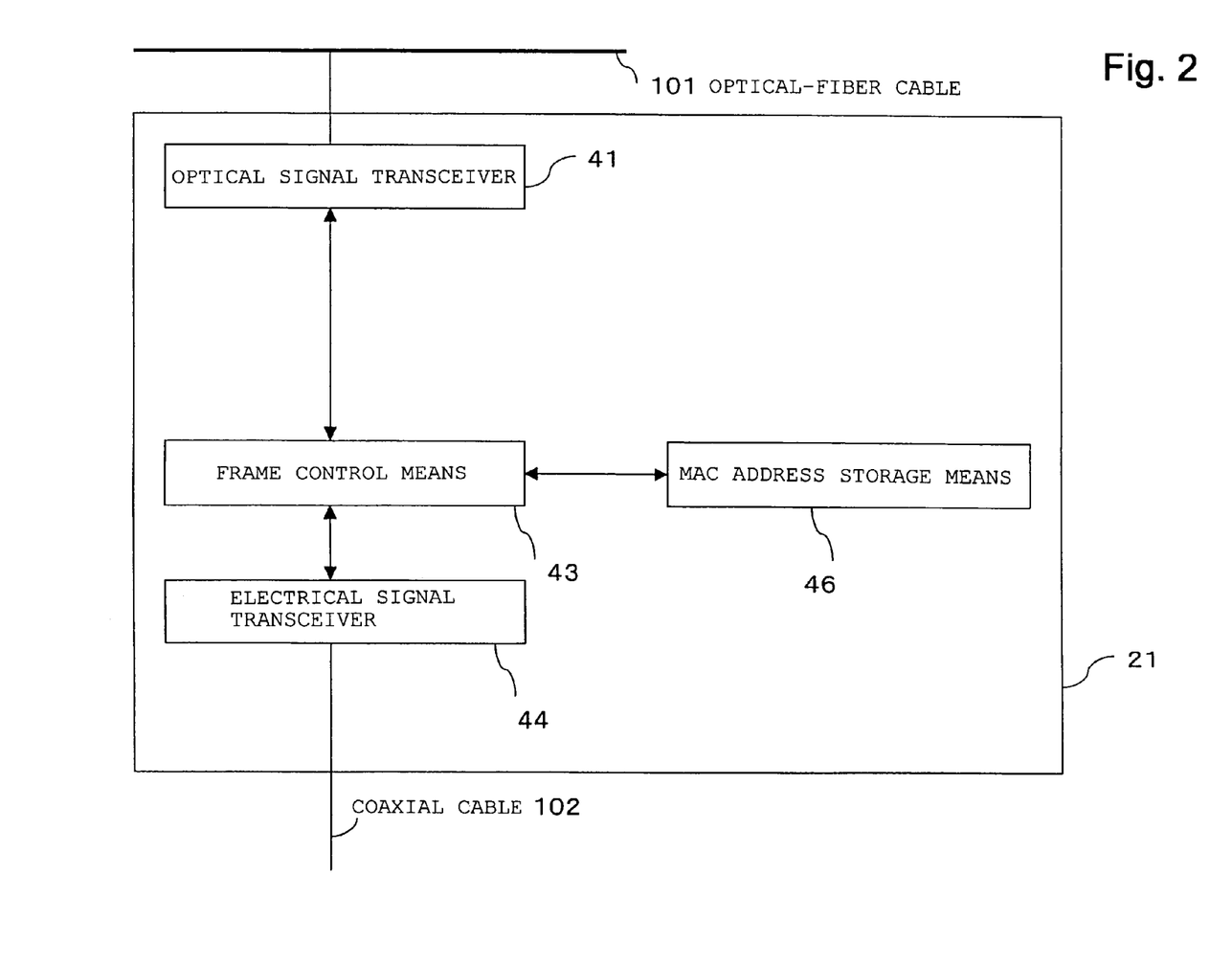
FIG. 2 is a block diagram showing the arrangement of a media converter according to the embodiment of the present invention.

FIG. 2 shows a block diagram of the media converter 21.

The media converter 21 comprises an optical signal transceiver 41, frame control means 43, electrical signal transceiver 44, and MAC address storage means 46. Note that MAC address stands for Media Access Control address and is used to designate a node (the PC 32a, 32b, 32c, or the like) serving as a communication partner.

The optical signal transceiver 41 is means of converting, into a frame as data, a packet called a frame which is sent as an optical signal by the optical-fiber cable 101 from the Internet connecting unit 11 as well as converting a frame as data output from the frame control means 43 into an optical signal and outputting the signal to the optical-fiber cable 101.

The frame control means 43 is means of outputting a frame, output from the electrical signal transceiver 44, not to the optical signal transceiver 41 but to the electrical signal transceiver 44 again if a transfer destination MAC address stored in the frame header of the frame coincides with any of MAC addresses stored in the MAC address storage means 46, outputting the frame, output from the electrical signal transceiver 44, to the optical signal transceiver 41 if the transfer destination MAC address stored in the frame header of the frame coincides with none of the MAC addresses stored in the MAC address storage means 46, and outputting a frame, output from the optical signal transceiver 41, to the electrical signal transceiver 44.

The electrical signal transceiver 44 is means of converting, into a frame as data, a packet called a frame which is sent as an electrical signal by each coaxial cable 102 from the corresponding one of the communication units 31a, 31b, 31c, and the like as well as converting, into an electrical signal, a frame as data output from the frame control means 43 and outputting the signal to the coaxial cable 102.

The MAC address storage means 46 is means of storing the MAC addresses of the PC 32a, PC 32b, PC 32c, and the like connected to a side toward the signal distributor 22 of the media converter 21.

Figure 3:
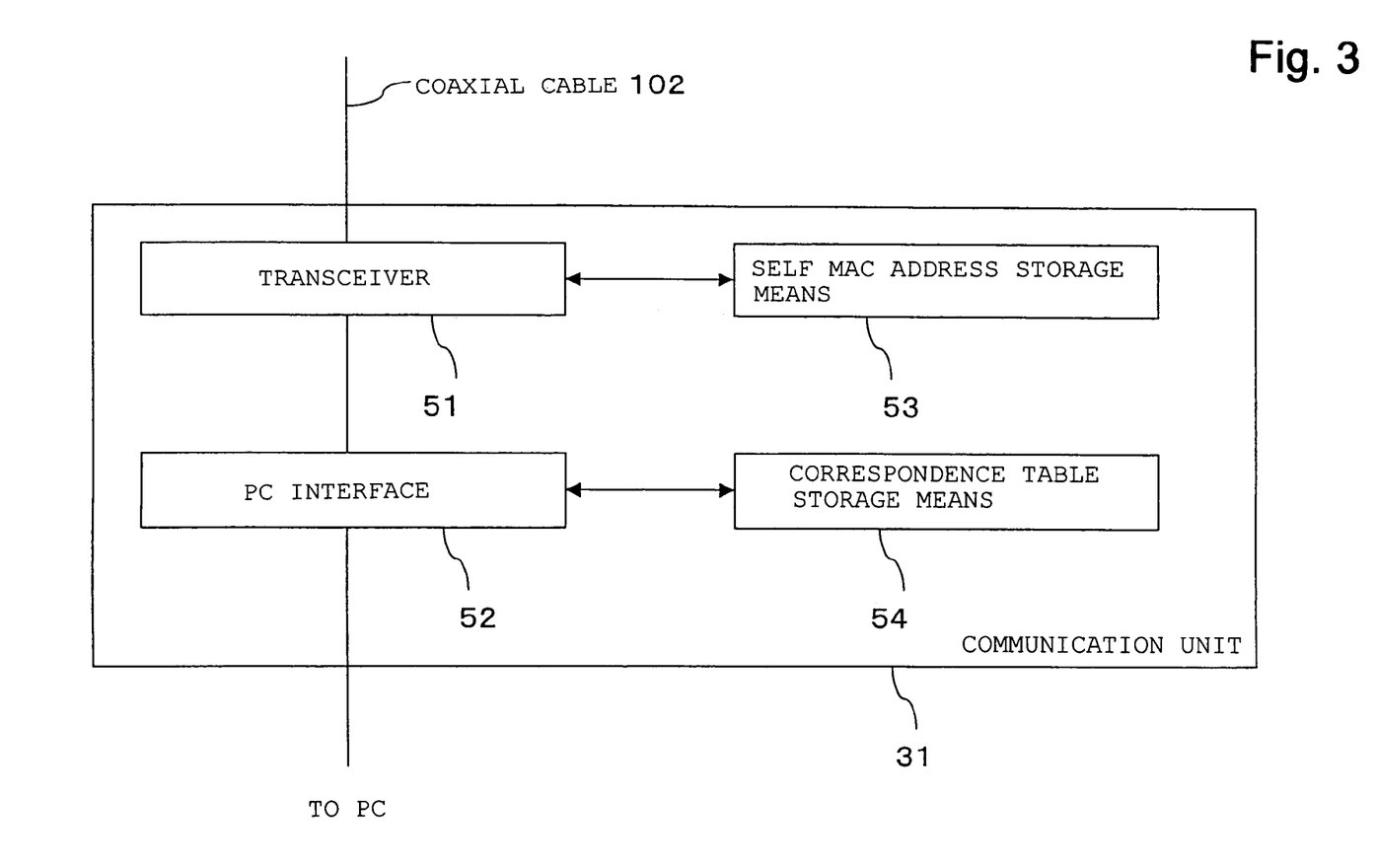
FIG. 3 is a block diagram showing the arrangement of a communication unit according to the embodiment of the present invention.

FIG. 3 shows a block diagram of each communication unit 31. FIG. 3 represents the communication unit 31 on behalf of the communication units 31a, 31b, 31c, and the like in FIG. 1, and each of the communication units 31a, 31b, and 31c in FIG. 1 has the same arrangement as the communication unit 31 in FIG. 3.

The communication unit 31 comprises a transceiver 51, PC interface 52, self MAC address storage means 53, and correspondence table storage means 54.

The transceiver 51 is means of converting, into an electrical signal, a frame as data output from the PC interface 52 and outputting the signal to the corresponding coaxial cable 102, and converting, into a frame as data, a frame sent as an electrical signal by the coaxial cable 102 from the signal distributor 22.

The PC interface 52 is means of reconstructing an IP packet from a frame as data output from the transceiver 51 and outputting the packet to the PC 32 as well as generating a frame from an IP packet output from the PC 32 and outputting the frame to the transceiver 51.

The self MAC address storage means 53 is means of storing the MAC address of the PC 32.

The correspondence table storage means 54 is means of storing a table which associates IP addresses with MAC addresses.

Figure 4:
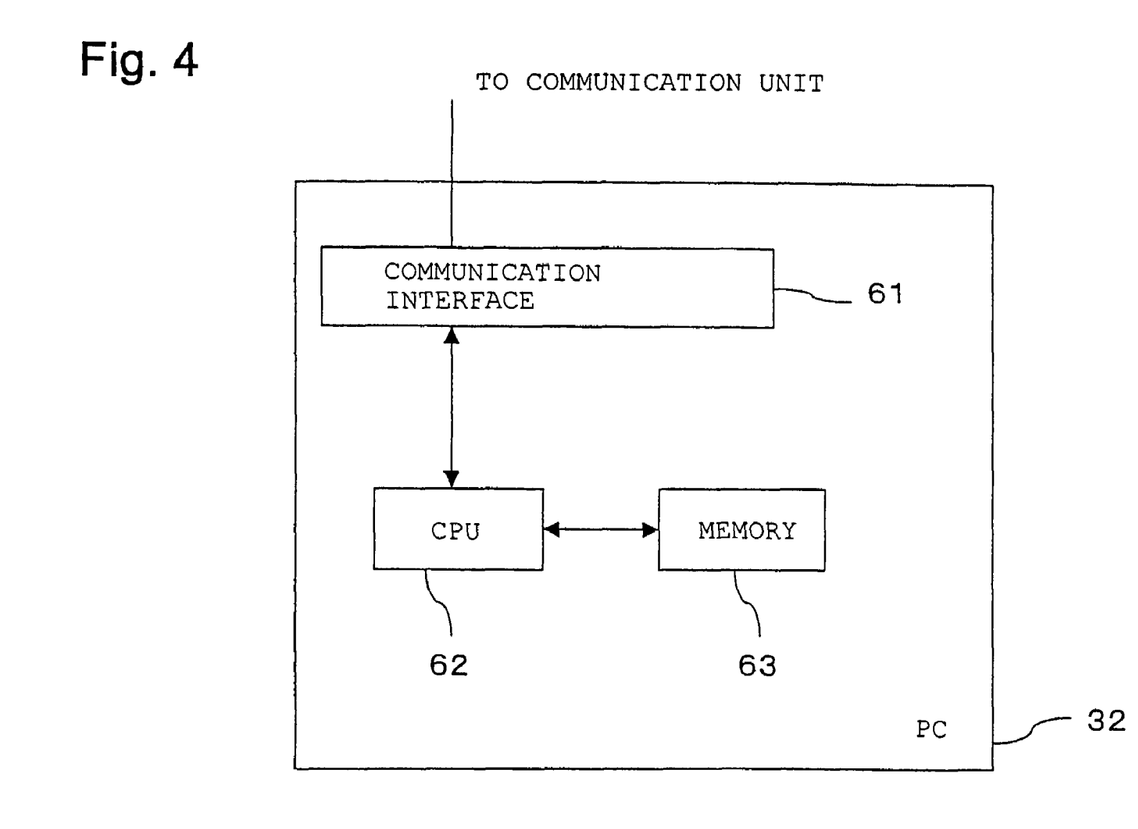
FIG. 4 is a block diagram showing the arrangement of a PC according to the embodiment of the present invention.

FIG. 4 shows a block diagram of each PC 32. FIG. 4 represents the PC 32 on behalf of the PCs 32a, 32b, 32c, and the like in FIG. 1, and each of the PCs 32a, 32b, 32c, and the like in FIG. 1 has the same arrangement as the PC 32 in FIG. 4.

The PC 32 comprises a communication interface 61, CPU 62, memory 63, and the like. Note that FIG. 4 shows only the minimum components of the PC 32, and other components are omitted. Although not shown in FIG. 4, the PC 32 naturally comprises components such as a hard disk and display.

The communication interface 61 is means of generating an IP packet from data sent from the CPU 62 and outputting the packet to the corresponding communication unit 31, and reconstructing data from an IP packet sent from the communication unit 31 and transferring the data to the CPU 62.

The CPU 62 is means of executing a program stored in the memory 63 or transferring data.

The memory 63 is means of storing data and a program.

Note that the Internet connecting unit 11 corresponds to an Internet connecting unit of the present invention; the media converter 21, a media converter of the present invention; the signal distributor 22, a signal distributor of the present invention; and the transmitting system of this embodiment, a transmitting system of the present invention. The MAC address storage means 46 corresponds to address storage means of the present invention.

The operation of this embodiment will be explained. Note that while explaining the operation of the transmitting system of this embodiment, an embodiment of a transmitting method of the present invention will also be explained.

When each communication unit 31 is to access the Internet, it links to the media converter 21 through the signal distributor 22 using the corresponding coaxial cable 102 as a medium. More specifically, the communication unit 31 comes to share, with the media converter 21, rules about how to transmit electrical signals through the coaxial cable 102. The communication unit 31 shares, with the media converter 21, a frequency band in which electrical signals are transmitted and received and clock signals which determine the timing for the transmission of electrical signals as these rules. A node (the PC 32a, 32b, 32c or the like) serving as a communication partner can be designated by a MAC address which is used for the coaxial cable 102 as the medium and which both the communication unit 31 and the media converter 21 can recognize. The link between the communication unit 31 and the media converter 21 allows communication between the communication unit 31 and the media converter 21.

The media converter 21 links to the Internet connecting unit 11 using the optical-fiber cable 101 as a medium. More specifically, the media converter 21 comes to share, with the Internet connecting unit 11, rules about how to transmit optical signals through the optical-fiber cable 101. The media converter 21 shares, with the Internet connecting unit 11, a wavelength on which optical signals are transmitted and received, the band of the wavelength, and clock signals which determine the timing for the transmission of optical signals as these rules. A node serving as a communication partner can be designated by a MAC address which uses the optical-fiber cable 101 as a medium and which both the media converter 21 and the Internet connecting unit 11 can recognize. The link between the media converter 21 and the Internet connecting unit 11 allows communication between the media converter 21 and the Internet connecting unit 11.

The media converter 21 forwards an Internet access communication from each communication unit 31 to the Internet connecting unit 11. Upon reception of the forwarded Internet access communication, the Internet connecting unit 11 forwards this communication to the Internet.

Upon reception of a communication from the Internet to each communication unit 31, the Internet connecting unit 11 forwards this communication to the media converter 21. Upon reception of the forwarded communication to the communication unit 31, the media converter 21 forwards this communication to the communication unit 31. The communication unit 31 implements access to the Internet by the above-described operation.

The operation will be explained in more detail in each of three typical cases: (A) the PC 32 (indicating any of the PC 32a, PC 32b, and PC 32c) transfers data to the Internet; (B) the PC 32 (indicating any of the PC 32a, PC 32b, and PC 32c) receives data sent from the Internet; and (C) the PC 32a communicates with the PC 32b.

(A) First, a case will be explained wherein the PC 32 (indicating any of the PC 32a, PC 32b, and PC 32c) transfers data to the Internet.

In FIG. 4, the CPU 62 of the PC 32 reads data stored in the memory 63 and transfers the data to the communication interface 61. The communication interface 61 generates an IP packet from the data transferred from the CPU 62. Note that an IP packet is a packet used in IP (Internet Protocol), which is a protocol that connects networks and identifies a node using an IP address that is a universal address.

Figure 8:
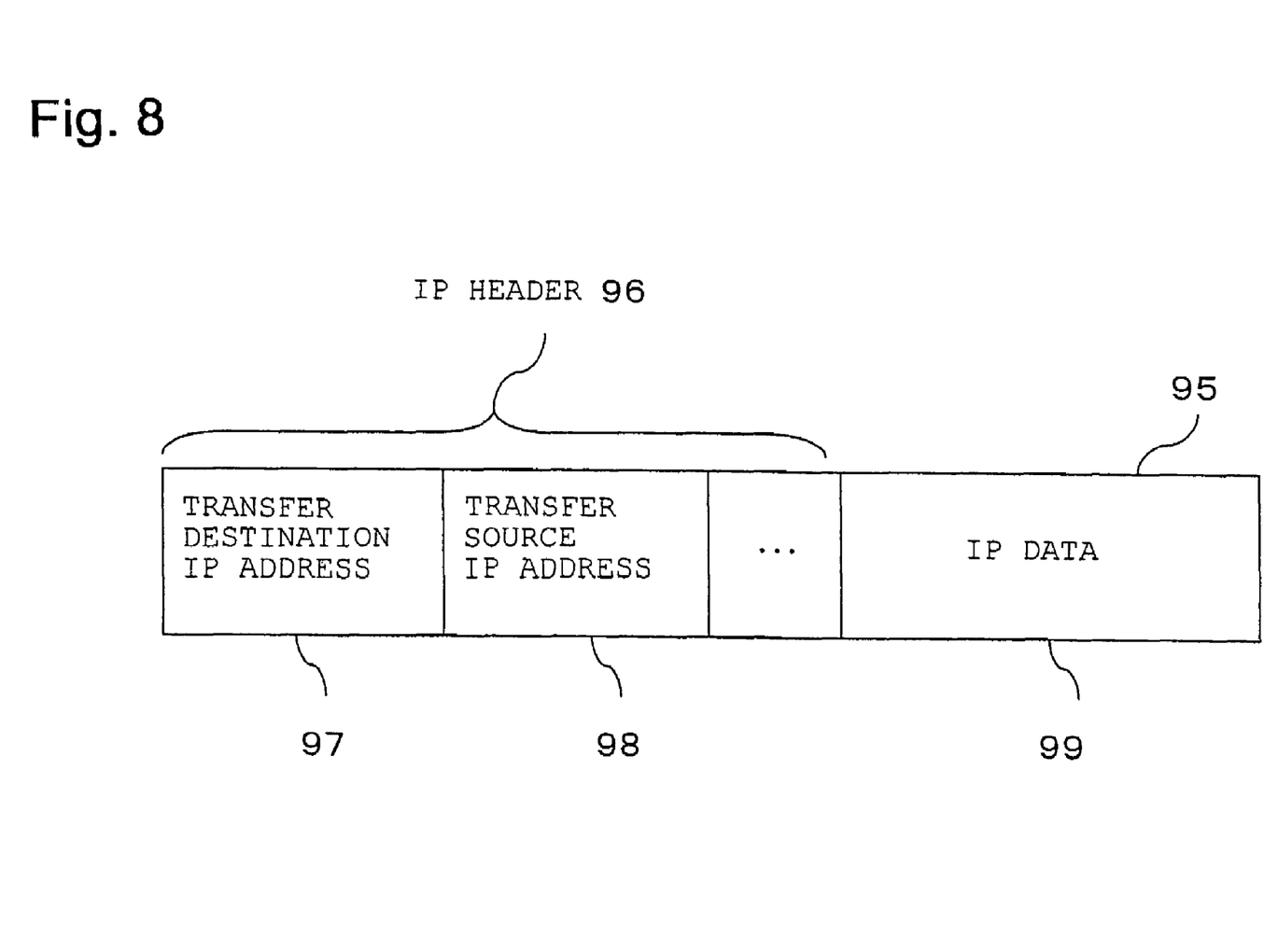
FIG. 8 is a diagram showing an example of an IP packet according to the embodiment of the present invention.

FIG. 8 shows an IP packet 95 generated by the communication interface 61. The IP packet 95 is composed of an IP header 96 serving as a header part and IP data 99 serving as a data part. A transfer destination IP address 97 which is the IP address of a data transfer destination and a transfer source IP address 98 which is the IP address of a data transfer source are described in the IP header 96.

The communication interface 61 outputs the generated IP packet 95 to the PC interface 52.

In the communication unit 31, the PC interface 52 generates a packet called a frame from the IP packet 95 output from the communication interface 61, utilizing a correspondence table stored in the correspondence table storage means 54.

Figure 7:
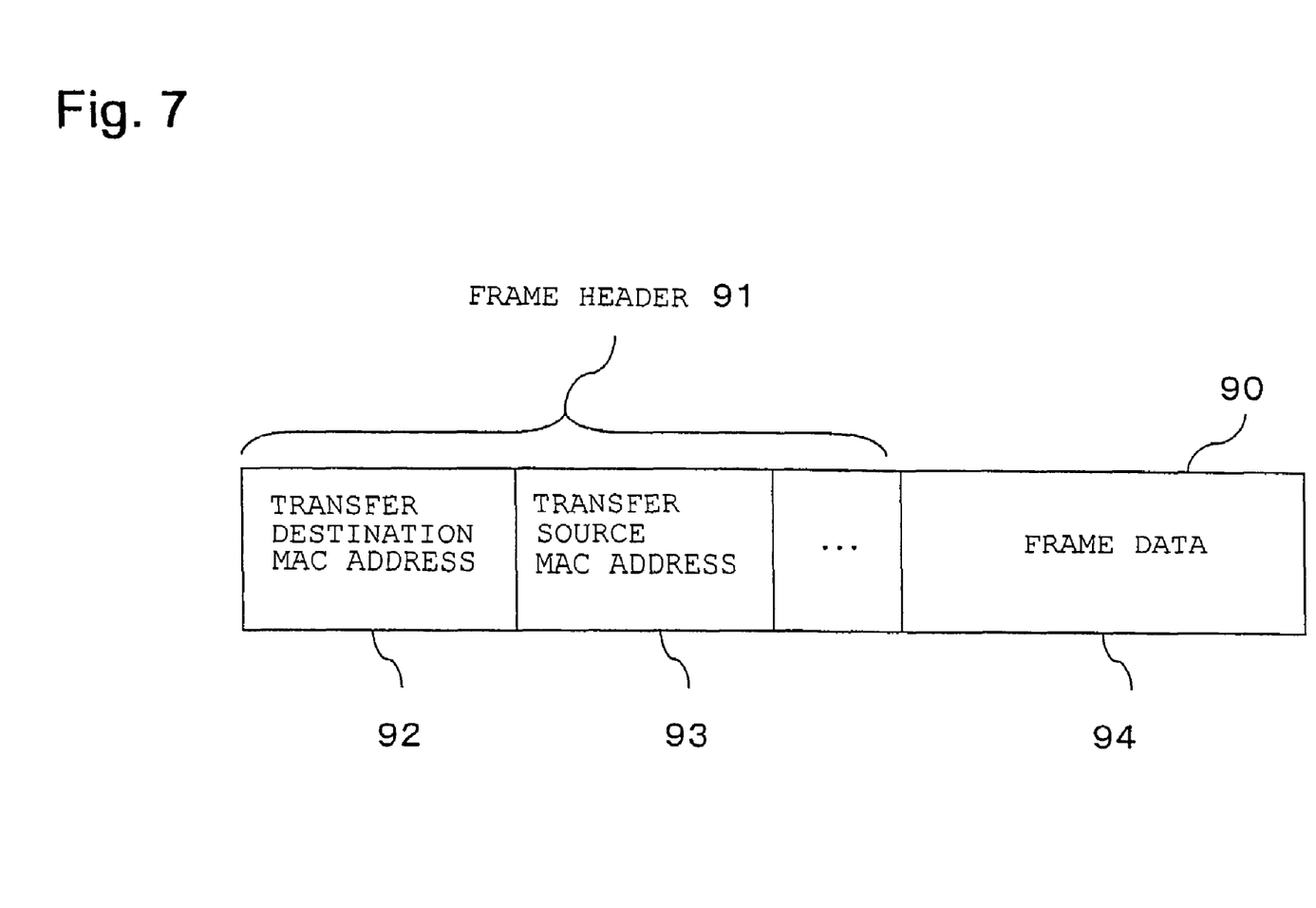
FIG. 7 is a diagram showing an example of a frame according to the embodiment of the present invention.

FIG. 7 shows a frame 90 generated by the PC interface 52. The frame 90 is composed of a frame header 91 serving as a header part and frame data 94 serving as a data part. A transfer destination MAC address 92 which is the MAC address of a transfer destination and a transfer source MAC address 93 which is the MAC address of a transfer source are described in the frame header 91. Note that MAC address stands for Media Access Control Address, as described above, is assigned at the manufacturing stage of a device, and is not designated by a user afterward, unlike an IP address.

Figure 6:
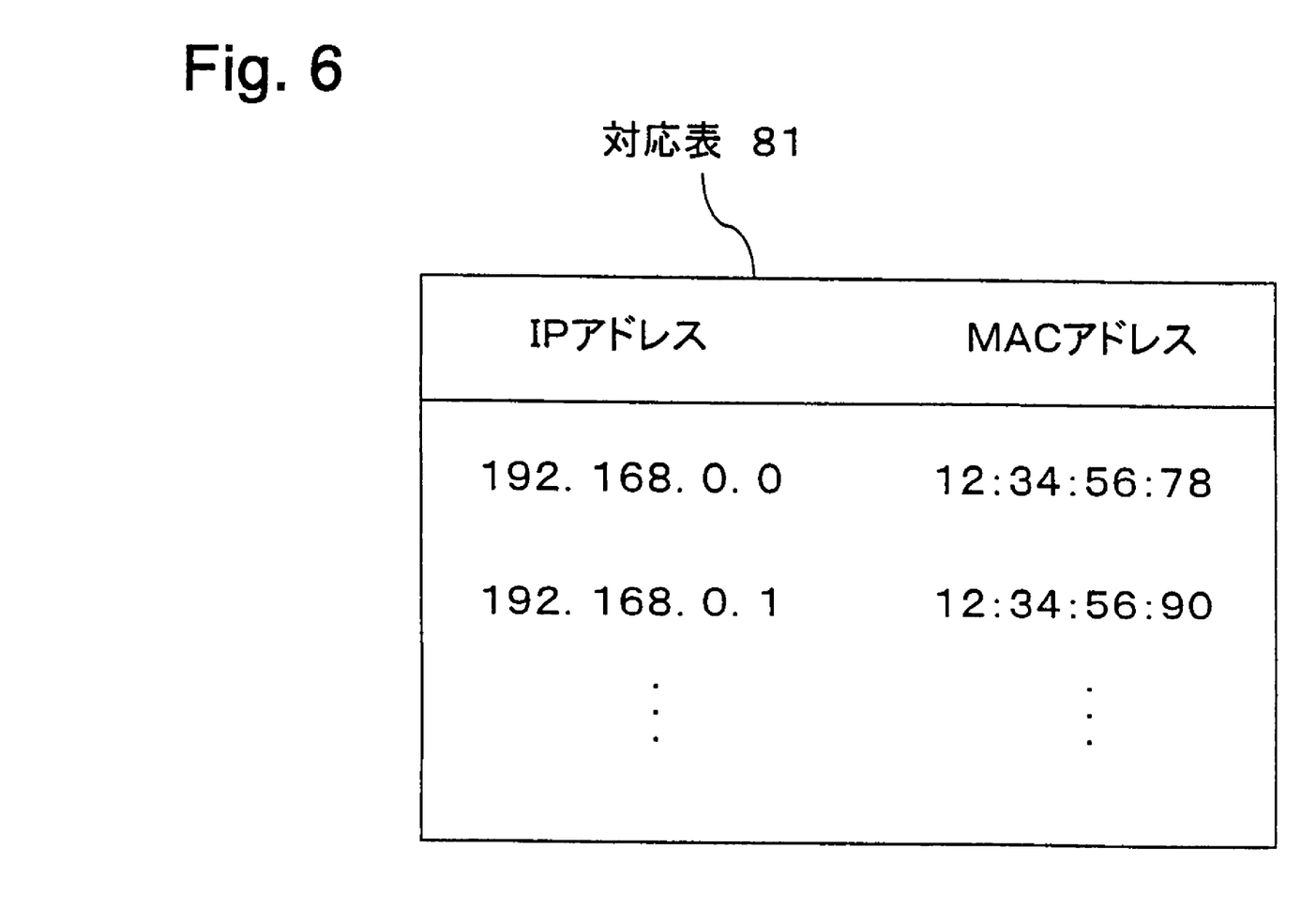
FIG. 6 is a diagram showing an example of a correspondence table stored in correspondence table storage means according to the embodiment of the present invention.

FIG. 6 shows a correspondence table 81 stored in the correspondence table storage means 54. The correspondence table 81 is a table for associating IP addresses with MAC addresses.

The PC interface 52 obtains the transfer destination MAC address 92 from the transfer destination IP address 97 stored in the IP header 96 of the IP packet 95 output from the communication interface 61, utilizing the correspondence table 81. Similarly, the PC interface 52 obtains the transfer source MAC address 93 from the transfer source IP address 98 stored in the IP header 96 of the IP packet 95, utilizing the correspondence table 81. The PC interface 52 stores one or a plurality of IP packets including the IP packet 95 at the frame data 94 and creates the frame header 91 by storing the transfer destination MAC address 92 and transfer source MAC address 93 obtained in advance, and the like. The PC interface 52 outputs the frame 90 thus created to the transceiver 51.

The transceiver 51 converts the frame 90 output from the PC interface 52 into an electrical signal and outputs the signal to the corresponding coaxial cable 102.

The frame 90 output from the transceiver 51 is combined by the signal distributor 22 and is input to the media converter 21.

In the media converter 21, the electrical signal transceiver 44 receives, through the coaxial cable 102, the frame 90 having undergone combination by the signal distributor 22, converts the electrical signal into data, and outputs the data to the frame control means 43.

The frame control means 43 of the media converter 21 determines whether the transfer destination MAC address 92 of the frame 90 coincides with any of MAC addresses stored in the MAC address storage means 46.

Figure 5:
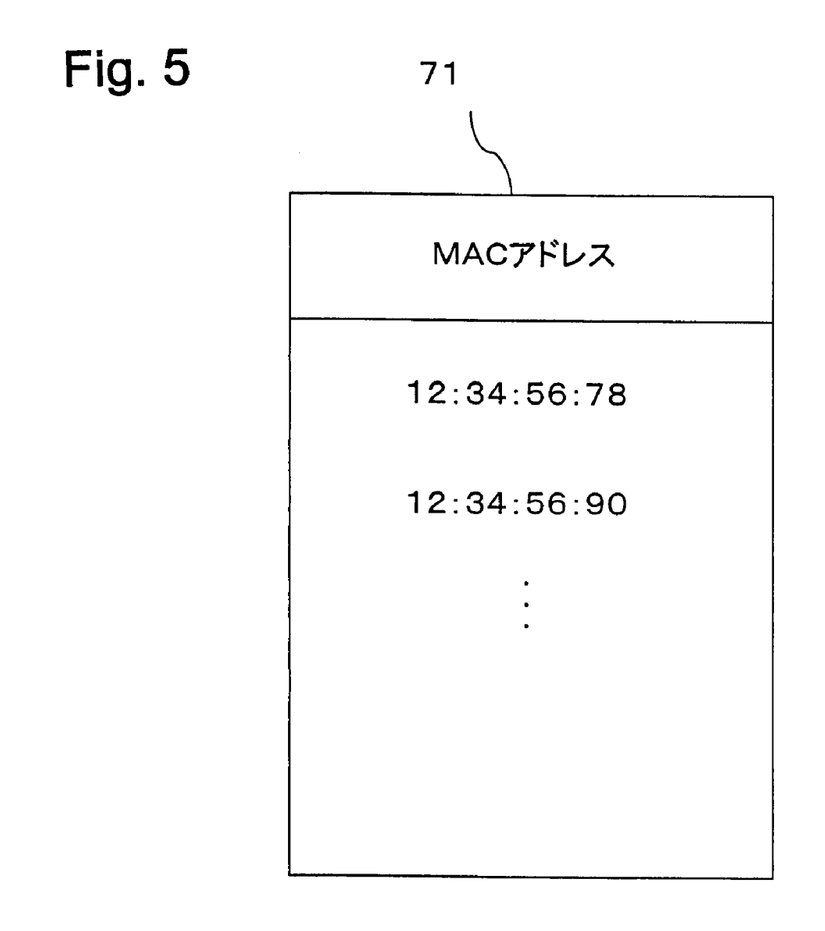
FIG. 5 is a diagram showing examples of a MAC address stored in MAC address storage means according to the embodiment of the present invention.

FIG. 5 shows an example of a MAC address 71 stored in the MAC address storage means 46. The MAC addresses of the PCs 32 such as the PC 32a, PC 32b, and PC 32c connected to the down side of the signal distributor 22 are stored in the MAC address storage means 46.

Since the PC 32 is transferring data to the Internet, a MAC address other than the MAC addresses of the PCs 32 such as the PC 32a, PC 32b, and PC 32c connected to the down side of the signal distributor 22 is described as the transfer destination MAC address 92 described in the frame header 91 of the frame 90.

Since the result of the above-described determination shows that the transfer destination MAC address 92 of the frame 90 coincides with none of the MAC addresses stored in the MAC address storage means 46, the frame control means 43 outputs the frame 90 to the optical signal transceiver 41.

The optical signal transceiver 41 converts, into an optical signal, the frame 90 output from the frame control means 43 and outputs the signal to the optical-fiber cable 101. Note that a frame generated when the optical signal transceiver 41 converts the frame 90 into an optical signal generally uses a data format different from that for the frame 90 transmitted to the coaxial cable 102. However, the frame to be transmitted to the optical-fiber cable 101 has a commonality with the frame 90 in that the frame has the transfer destination MAC address 92, transfer source MAC address 93, frame header 91, and frame data 94, as shown in the frame 90 of FIG. 7.

Upon reception of a frame transmitted through the optical-fiber cable 101, the Internet connecting unit 11 sends out the frame to the Internet.

(B) Secondly, a case will be explained wherein the PC 32 (indicating any of the PC 32a, PC 32b, and PC 32c) receives data sent from the Internet.

An IP packet sent from the Internet is received by the Internet connecting unit 11 and is output to the optical-fiber cable 101 as a frame serving as an optical signal.

The optical signal transceiver 41 of the media converter 21 receives the frame transmitted from the optical-fiber cable 101, converts the frame into data, and outputs the data to the frame control means 43.

The frame control means 43 converts the frame output by the optical signal transceiver 41 into a frame data format for the coaxial cables 102. An example of the converted frame is the frame 90 in FIG. 7.

The electrical signal transceiver 44 converts, into an electrical signal, the frame 90 output from the frame control means 43 and outputs the signal to the coaxial cable 102.

The signal distributor 22 distributes the electrical signal output from the media converter 21 to the coaxial cables 102 respectively connected to the communication units 31a, 31b, 31c, and the like.

The communication unit 31 (indicating any communication unit of the communication units 31a, 31b, 31c, and the like) receives the frame 90 transmitted from the signal distributor 22 through the corresponding coaxial cable 102. More specifically, the transceiver 51 of the communication unit 31 receives the frame 90 transmitted from the signal distributor 22 through the coaxial cable 102 and converts the electrical signal into data. If the transfer destination MAC address 92 of the frame 90 coincides with the MAC address of the PC 32 itself stored in the self MAC address storage means 53, the data is output to the PC interface 52.

The PC interface 52 reconstructs the IP packet 95 from the frame 90 and outputs the packet to the PC 32b.

Upon reception of the IP packet 95, the PC 32b reconstructs the packet into data and transfers the data to the CPU 62.

In this manner, the PC 32 of this embodiment implements access to the Internet. (C) Thirdly, the operation performed when the PC 32a communicates with the PC 32b will be explained.

More specifically, a case will be explained wherein the PC 32a transfers data to the PC 32b.

In FIG. 4, the CPU 62 of the PC 32a reads data stored in the memory 63 and transfers the data to the communication interface 61. The communication interface 61 generates an IP packet from the data transferred from the CPU 62.

FIG. 8 shows the IP packet 95 generated by the communication interface 61. The IP packet 95 is composed of the IP header 96 serving as a header part and the IP data 99 serving as a data part. The transfer destination IP address 97, which is the IP address of a data transfer destination, and the transfer source IP address 98, which is the IP address of a data transfer source, are described in the IP header 96. The communication interface 61 describes the IP address of the PC 32b as the transfer destination IP address 97 and the IP address of the PC 32a itself as the transfer source IP address 98.

The communication interface 61 outputs the generated IP packet 95 to the PC interface 52.

The PC interface 52 generates a packet called a frame from the IP packet 95 output from the communication interface 61, utilizing the correspondence table 81 stored in the correspondence table storage means 54.

FIG. 7 shows the frame 90 generated by the PC interface 52. The frame 90 is composed of the frame header 91 serving as a header part and the frame data 94 serving as a data part. The transfer destination MAC address 92, which is the MAC address of a transfer destination, and the transfer source MAC address 93, which is the MAC address of a transfer source, are described in the frame header 91.

FIG. 6 shows the correspondence table 81 stored in the correspondence table storage means 54. The correspondence table 81 is a table for associating IP addresses with MAC addresses.

The PC interface 52 obtains the transfer destination MAC address 92 from the transfer destination IP address 97 stored in the IP header 96 of the IP packet 95 output from the communication interface, utilizing the correspondence table 81. Similarly, the PC interface 52 obtains the transfer source MAC address 93 from the transfer source IP address 98 stored in the IP header 96 of the IP packet 95, utilizing the correspondence table 81. Accordingly, the MAC address of the PC 32b is stored in the transfer destination MAC address 92 while the MAC address of the PC 32a is stored in the transfer source IP address 98. The PC interface 52 stores one or a plurality of IP packets including the IP packet 95 at the frame data 94 and creates the frame header 91 by storing the transfer destination MAC address 92 and transfer source MAC address 93 obtained in advance, and the like. The PC interface 52 outputs the frame 90 thus created to the transceiver 51.

The transceiver 51 converts, into an electrical signal, the frame 90 output from the PC interface 52 and outputs the signal to the corresponding coaxial cable 102.

The frame 90 serving as an electrical signal output to the coaxial cable 102 is combined by the signal distributor 22 and is input to the media converter 21.

In the media converter 21, the electrical signal transceiver 44 receives, through the coaxial cable 102, the frame 90 output from the PC interface 52, converts the electrical signal into data, and outputs the data to the frame control means 43.

The frame control means 43 of the media converter 21 determines whether the transfer destination MAC address 92 of the frame 90 coincides with any of MAC addresses stored in the MAC address storage means 46.

FIG. 5 shows an example of the MAC address 71 stored in the MAC address storage means 46. The MAC addresses of the PCs 32 such as the PC 32a, PC 32b, and PC 32c connected to the down side of the signal distributor 22 are stored in the MAC address storage means 46.

Since the PC 32a is transferring data to the PC 32b, the MAC address of the PC 32b is described as the transfer destination MAC address 92 described in the frame header 91 of the frame 90.

Since the result of the above-described determination shows that the transfer destination MAC address 92 of the frame 90 coincides with any of the MAC addresses stored in the MAC address storage means 46, the frame control means 43 outputs the frame 90 to the electrical signal transceiver 44.

The electrical signal transceiver 44 converts, into an electrical signal, the frame 90 output from the frame control means 43 and outputs the signal to the coaxial cable 102.

The signal distributor 22 distributes the electrical signal output from the media converter 21 to the coaxial cables 102 respectively connected to the communication units 31a, 31b, 31c, and the like.

The communication unit 31 (any communication unit of the communication units 31a, 31b, 31c, and the like) receives the frame 90 transmitted from the signal distributor 22 through the corresponding coaxial cable 102. More specifically, the communication interface 61 of the communication unit 31b receives the frame 90 transmitted from the signal distributor 22 through the coaxial cable 102 and converts the electrical signal into data. Since the transfer destination MAC address 92 of the frame 90 coincides with the MAC address of the PC 32b itself stored in the self MAC address storage means 53, the communication interface 61 outputs the data to the PC interface 52.

The PC interface 52 reconstructs the IP packet 95 from the frame 90 and outputs the packet to the PC 32.

Upon reception of the IP packet 95, the PC 32 reconstructs the packet into data and transfers the data to the CPU 62.

In this manner, the PC 32a of this embodiment can transfer data to the PC 32b.

The three typical cases (A) to (C) have been explained above.

As described above, if the transfer destination MAC address 92 described in the frame header 91 of the frame 90 coincides with none of MAC addresses stored in the MAC address storage means 46, the frame control means 43 of the media converter 21 outputs the frame 90 to the optical signal transceiver 41. On the other hand, if the transfer destination MAC address 92 coincides with any of the MAC addresses stored in the MAC address storage means 46, the frame control means 43 outputs the frame 90 not to the optical signal transceiver 41 but to the electrical signal transceiver 44, thus allowing communication between terminals such as the PC 32a and PC 32b.

If the Internet connecting unit 11 fails to fulfill its function due to a failure or the like, the PC 32a or the like becomes unable to access the Internet. Even in this case, if the media converter 21 performs the above-described operation, communication between the PC 32a and the PC 32b can be performed without any trouble. The media converter 21 converts an optical signal received from the optical-fiber cable 101 into data, converts the data into an electrical signal, and outputs the signal to each coaxial cable 102. In addition, after the media converter 21 converts an electrical signal received from each coaxial cable 102 into data, it converts the data into an optical signal and outputs the signal to the optical-fiber cable 101 or converts the data into an electrical signal again and outputs the signal to the coaxial cable 102. For this reason, communication can be performed without any attenuation of signals.

This embodiment has been explained above in detail.

(1) Note that although in this embodiment, the media converter 21 has been explained as always linked to the communication units 31a, 31b, and 31c, and the communication units 31a, 31b, and 31c have been explained as sharing a link, the present invention is not limited to this.

More specifically, if the Internet connecting unit 11 becomes unable to link to all or some of the communication units 31a, 31b, and 31c, the Internet connecting unit 11 may give the media converter 21 a warning that the Internet connecting unit 11 has become unable to establish any link. Upon reception of the warning, the media converter 21 may perform the operation described as for the communication between the PC 32a and the PC 32b. That is, if the Internet connecting unit 11 is linked to the communication units 31a, 31b, and 31c, the frame control means 43 of the media converter 21 simply transfers a frame from the optical signal transceiver 41 to the electrical signal transceiver 44 and simply transfers a frame from the electrical signal transceiver 44 to the optical signal transceiver 41. Assume that the Internet connecting unit 11 gives the media converter 21 a warning that the Internet connecting unit 11 has become unable to establish any link. In this case, upon reception of the warning, the media converter 21 may perform the operation described above as for the communication between the PC 32a and the PC 32b.

(2) In the above explanation, the optical-fiber cable 101 may be a medium other than an optical-fiber cable, i.e., a coaxial cable, wireless medium, telephone line, power line, or Ethernet cable, or may be a medium similar to them. The coaxial cable 102 maybe a medium other than a coaxial cable, i.e., an optical-fiber cable, wireless medium, telephone line, power line, or Ethernet cable, or may be a medium similar to them. Any combination of media similar to the optical-fiber cable 101 and the coaxial cable 102 may be used.

(3) The signal distributor 22 may be installed in the home of each subscriber.

(4) Alternatively, both the media converter 21 and signal distributor 22 may be installed in the home of each subscriber.

(5) The media converter 21 may be connected with a plurality of signal distributors 22 and may establish independent links or a shared link with the communication units 31 under their signal distributors 22.

(6) Data to be communicated among the communication units 31, media converter 21, and Internet connecting unit 11 is not limited to Internet access data. The data may be video data, audio data, or data similar to them.

(7) A program of the present invention is a program of causing a computer to perform the operations in all or some steps of the above-described transmitting method of the present invention, wherein the program operates in cooperation with the computer.

A recording medium of the present invention is a recording medium carrying a program of causing a computer to perform all or some operations in all or some steps of the transmitting method of the present invention as described above, wherein the recording medium is readable by the computer, and the read program performs the operations in cooperation with the computer.

The phrase "some steps" described above of the present invention means one or several steps of those steps.

The phrase "operations in steps" described above of the present invention means operations in all or some of the steps.

A usage form of the program of the present invention may be an aspect in which the program is recorded on a computer-readable recording medium and operates in cooperation with the computer.

A usage form of the program of the present invention may be an aspect in which the program is transmitted in a transmission medium, is read by a computer, and operates in cooperation with the computer.

Examples of a recording medium include a ROM and the like. Examples of a transmission medium include a transmission medium such as the Internet, light, radio wave, sound wave, and the like.

The above-described computer of the present invention is not limited to pure hardware such as a CPU, and may also include firmware, OS, and peripheral equipment.

Note that as described above, the arrangement of the present invention may be implemented by software or may be implemented by hardware.

As described above, the present invention can be applied to the whole of a general Internet access system. The present invention can also be provided to a broadcasting system which distributes content from a central device to ordinary homes.

A transmitting system, media converter, and transmitting method of the present invention have the effect of allowing communication between terminals even if an abnormality occurs in an Internet connecting unit such as a central device or repeater, and a link to each terminal is lost. The present invention is useful for a transmitting system, media converter, transmitting method, and the like which allow communication between terminals.

What is claimed is:

1. A transmitting system comprising:
   an Internet connecting unit configured to allow a plurality of communication units to perform communication through an Internet, said Internet connecting unit being directly or indirectly connected with said Internet;
   a media converter configured for converting a signal from a first transmission medium into a signal formatted for transmission to a second transmission medium, and for converting a signal from said second transmission medium into a signal formatted for transmission to said first transmission medium, said media converter being linked to said communication units, and connected with said Internet connecting unit by said first transmission medium; and
   a signal distributor configured for distributing signals (i) by transferring a signal from said media converter to said communication units, and (ii) by transferring a signal from said communication units to said media converter, said signal distributor being connected with said media converter and said plurality of said communication units respectively by said second transmission medium,
   wherein said linking of said media converter to said communication units is accomplished using rules for transmitting signals between said media converter and said communication units, said rules including utilizing communication addresses on a side of said communication units,
   said media converter includes address storage means of storing said communication addresses on said side of said plurality of said communication units, and
   said media converter is further configured to output data input from a side of said signal distributor to said side of said communication units when an address affixed to said data input from said side of said signal distributor is stored in said address storage means.

2. The transmitting system according to claim 1, wherein said media converter allows, by linking to the plurality of said communication units, communication between the plurality of said communication units.

3. The transmitting system according to claim 1, wherein said Internet connecting unit allows, by linking to the plurality of said communication units, the plurality of said communication units to perform communication using said Internet, and
   when said Internet connecting unit becomes unable to link to the plurality of said communication units, said media converter allows, by linking to the plurality of said communication units, communication between the plurality of said communication units.

4. The transmitting system according to claim 1, wherein said first transmission medium is an optical-fiber cable, and said second transmission medium is a coaxial cable.

5. A media converter comprising a converter configured for converting a signal from a first transmission medium into a signal formatted for transmission to a second transmission medium, for converting a signal from said second transmission medium into a signal formatted for transmission to said first transmission medium, and for allowing a plurality of communication units to perform communication through an Internet, said media converter being linked to said plurality of said communication units, and being connected with an Internet connecting units, directly or indirectly connected with said Internet, by said first transmission medium,
   wherein, by a signal distributor connected with said media converter and said plurality of said communication units respectively by said second transmission medium, a signal from said media converter is distributed and transferred to said communication units and a signal from said communication units is transferred to said media converter,
   said linking of said media converter to said communication units is accomplished using rules for transmitting signals between said media converter and said communication units, said rules including utilizing communication addresses on a side of said communication units, and
   said media converter includes address storage means of storing said communication addresses on a side of the plurality of said communication units, and
   said media converter is further configured to output data input from a side of said signal distributor to said side of said communication units when an address affixed to data input from said side of said signal distributor is stored in said address storage means.

6. A transmitting method comprising:
   an Internet communication step of, by utilizing an Internet connecting unit directly or indirectly connected with an Internet, allowing a plurality of communication units to perform communication through said Internet;
   a signal conversion step of, by utilizing a media converter configured for linking to said communication units and connecting with said Internet connecting unit by a first transmission medium, converting a signal from said first transmission medium into a signal formatted for transmission to a second transmission medium and converting a signal from said second transmission medium into a signal formatted for transmission to said first transmission medium; and
   a signal transfer step of, by utilizing a signal distributor connected with said media converter and said plurality of said communication units respectively by said second transmission medium, distributing signals by transferring a signal from said media converter to said communication units and by transferring a signal from said communication units to said media converter,
   wherein said linking to said communication units is accomplished using rules for transmitting signals between said media converter and said communication units, said rules including utilizing communication addresses on a side of said communication units,
   said media converter includes address storage means of storing said communication addresses on said side of said plurality of said communication units, and
   said media converter is further configured to output data input from a side of said signal distribution to said side of said communication units when an address affixed to data input from said side of said signal distributor is stored in said address storage means.

7. A computer-readable medium encoded with a program configured to cause a computer to perform the steps of claim 6.

* * * * *

UNITED STATES PATENT AND TRADEMARK OFFICE
CERTIFICATE OF CORRECTION

| | | |
|---|---|---|
| PATENT NO. | : 7,403,540 B2 | Page 1 of 1 |
| APPLICATION NO. | : 11/079062 | |
| DATED | : July 22, 2008 | |
| INVENTOR(S) | : Hiroyuki Watanabe et al. | |

It is certified that error appears in the above-identified patent and that said Letters Patent is hereby corrected as shown below:

Column 13, line 24, "accomplished rules for" should read -- accomplished using rules for --

Column 14, line 1, "Internet connecting units," should read -- Internet connecting unit, --

Signed and Sealed this

Second Day of December, 2008

JON W. DUDAS
*Director of the United States Patent and Trademark Office*